(12) United States Patent
Choi et al.

(10) Patent No.: US 9,798,176 B2
(45) Date of Patent: Oct. 24, 2017

(54) DISPLAY DEVICES

(71) Applicant: Samsung Display Co., Ltd., Yongin-si, Gyeonggi-do (KR)

(72) Inventors: Ji Yeon Choi, Yongin-si (KR); Sang Ji Park, Yongin-si (KR); Byung-Gon Kum, Suwon-si (KR)

(73) Assignee: Samsung Display Co., Ltd. (KR)

( * ) Notice: Subject to any disclaimer, the term of this patent is extended or adjusted under 35 U.S.C. 154(b) by 51 days.

(21) Appl. No.: 15/059,138

(22) Filed: Mar. 2, 2016

(65) Prior Publication Data
US 2016/0299377 A1  Oct. 13, 2016

(30) Foreign Application Priority Data

Apr. 7, 2015 (KR) .................. 10-2015-0049114

(51) Int. Cl.
| | | |
|---|---|---|
| G02F 1/1333 | (2006.01) | |
| G02F 1/1368 | (2006.01) | |
| G02F 1/1341 | (2006.01) | |
| G02F 1/133 | (2006.01) | |
| G02F 1/1343 | (2006.01) | |
| G02F 1/161 | (2006.01) | |
| G02F 1/163 | (2006.01) | |
| G02F 1/155 | (2006.01) | |
| G02F 1/1334 | (2006.01) | |

(52) U.S. Cl.
CPC ...... G02F 1/133377 (2013.01); G02F 1/1334 (2013.01); G02F 1/1341 (2013.01); G02F 1/1368 (2013.01); G02F 1/13306 (2013.01); G02F 1/134336 (2013.01); G02F 1/155 (2013.01); G02F 1/161 (2013.01); G02F 1/163 (2013.01); G02F 2001/1635 (2013.01)

(58) Field of Classification Search
CPC .................. G02F 1/133377; G02F 1/1334
See application file for complete search history.

(56) References Cited

U.S. PATENT DOCUMENTS 5,416,617 A * 5/1995 Loiseaux .................. E06B 9/24
349/1

FOREIGN PATENT DOCUMENTS

| JP | 2004-069926 A | 3/2004 |
| KR | 10-2013-0097199 A | 9/2013 |
| KR | 10-2013-0124827 A | 11/2013 |

* cited by examiner

*Primary Examiner* — Kendrick Hsu
(74) *Attorney, Agent, or Firm* — Innovation Counsel LLP

(57) ABSTRACT

Provided is a display device including a display unit and a mirror unit adjacent to each other, in which the display unit includes a first substrate, a thin film transistor formed on the substrate, a pixel electrode connected to the thin film transistor, a roof layer formed on the pixel electrode to be spaced apart from the pixel electrode with a microcavity therebetween, and a liquid crystal layer filling the microcavity, and the mirror unit includes a second substrate, a first electrode formed on the second substrate, a second electrode formed on the first substrate to be spaced apart from the first electrode with a microcavity therebetween, and an electrochromic layer formed in the microcavity.

20 Claims, 13 Drawing Sheets

DISPLAY DEVICES

CROSS-REFERENCE TO RELATED APPLICATION

This application claims priority to and the benefit of Korean Patent Application No. 10-2015-0049114 filed in the Korean Intellectual Property Office on Apr. 7, 2015, the entire contents of which are incorporated herein by reference.

BACKGROUND (a) Field

The present disclosure relates to a display device.

(b) Description of the Related Art

A liquid crystal display which is one of the most common types of flat panel displays currently in use, includes two display panels with field generating electrodes such as a pixel electrode and a common electrode, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images. The two display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two substrates are necessarily used, and respective constituent elements are formed on the two substrates, and as a result, there are problems in that the display device is heavy and thick, has high cost, and has a long processing time.

Further, recently, a portable electronic device such as a mobile or a portable information terminal includes various functions to be suitable for the demand of consumers. For example, the portable electronic device may include a mirror function. The mirror function may be implemented by attaching a mirror onto one surface of the portable electronic device. As a result, a user may use the mirror of the portable electronic device without carrying a separate mirror. However, in order to attach the mirror onto the portable electronic device, a separate space for attaching the mirror may be required. Accordingly, there is a problem in that a volume of the electronic device is increased and constraints of the design are increased.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a display device and a manufacturing method thereof having advantages of reducing a weight, a thickness, cost, and a processing time by manufacturing the display device by using one substrate.

Further, the present inventive concept has been made in an effort to provide a display device in which a mirror conversion is performed and provide a display device of which a thickness is not increased while a display function and a mirror function are performed.

An exemplary embodiment of the present inventive concept provides a display device including a display unit and a mirror unit adjacent to each other, in which the display unit includes a first substrate, a thin film transistor formed on the substrate, a pixel electrode connected to the thin film transistor, a roof layer formed on the pixel electrode to be spaced apart from the pixel electrode with a microcavity therebetween, and a liquid crystal layer filling the microcavity, and the mirror unit includes a second substrate, a first electrode formed on the second substrate, a second electrode formed on the first electrode to be spaced apart from the first electrode with a microcavity therebetween, and an electrochromic layer formed in the microcavity.

The first substrate of the display unit may be laminated on the second electrode of the mirror unit.

The roof layer of the display unit may be positioned on the second electrode of the mirror unit to face each other, and the second substrate of the mirror unit and the first substrate of the display unit may be formed at both outer sides of the display device.

The display unit may further include an overcoat formed on the roof layer to seal the microcavity.

The display device may further include an electrolyte layer and an ion injection layer sequentially laminated on the electrochromic layer in the microcavity of the mirror unit, and an overcoat sealing the microcavity.

The first electrode of the mirror unit may be a metal electrode.

The second electrode of the mirror unit may be a transparent electrode.

A width of the microcavity of the display unit and a width of the microcavity of the mirror unit may not be the same as each other.

The width of the microcavity of the mirror unit may be larger than the width of the microcavity of the display unit.

When the display device operates in a display mode, the electrochromic layer of the mirror unit may display a color.

When the display device operates in a mirror mode, the electrochromic layer of the mirror unit may be transparent.

Driving of the display unit and driving of the mirror unit may be performed in one driver.

Another exemplary embodiment of the present inventive concept provides a display device including: a substrate; and a plurality of microcavities formed on the substrate, in which the plurality of microcavities is divided into a microcavity of the mirror unit and a microcavity of the display unit, the microcavity of the display unit includes a pixel electrode, a roof layer formed on the pixel electrode to be spaced apart from the pixel electrode with a microcavity therebetween, and a liquid crystal layer filling the microcavity, and the microcavity of the mirror unit includes a first electrode, a second electrode formed on the first substrate to be spaced apart from the first electrode with a microcavity therebetween, and an electrochromic layer formed in the microcavity.

The microcavities of the mirror unit and the microcavities of the display unit may be alternately disposed for every line in a row or column direction.

The width of the microcavity of the mirror unit may be smaller than the width of the microcavity of the display unit.

The display device may further include an overcoat sealing the microcavity.

The display device may further include Ian electrolyte layer and an ion injection layer sequentially laminated on the electrochromic layer in the microcavity of the mirror unit.

The first electrode of the mirror unit may be a metal electrode, and the second electrode of the mirror unit may be a transparent electrode.

The pixel electrode and the common electrode of the display unit may be transparent electrodes.

The second electrode of the mirror unit and the common electrode of the display unit may be formed by a single process.

As such, according to the exemplary embodiment of the present inventive concept, it is possible to reduce the number of substrates by forming a display unit and a mirror unit as a structure having a microcavity and reduce a weight, a thickness, cost, and a processing time. Further, the display device is converted into a display mode and a mirror mode to function as various uses.

DETAILED DESCRIPTION OF THE EMBODIMENTS

Figure 1:
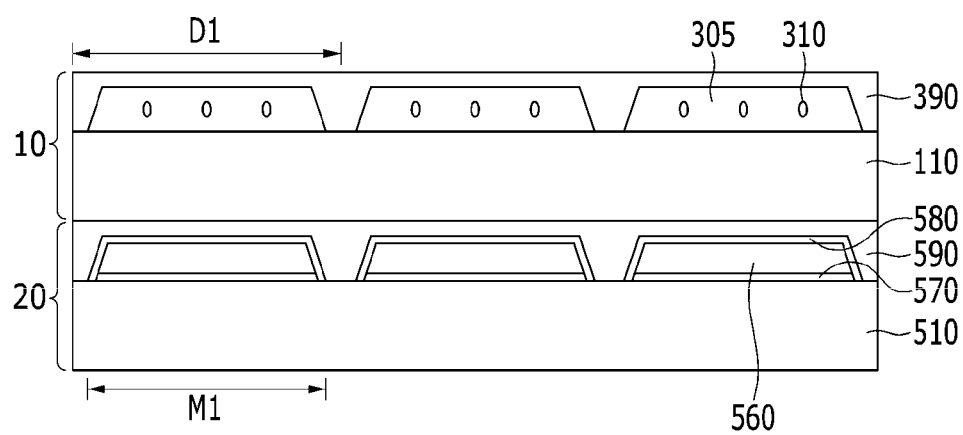
FIG. 1 is a cross-sectional view schematically illustrating a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device according to an exemplary embodiment of the present inventive concept will be described in detail with reference to the accompanying drawings.

FIG. 1 is a cross-sectional view schematically illustrating a display device according to an exemplary embodiment of the present inventive concept. Referring to FIG. 1, in the display device according to the exemplary embodiment of the present inventive concept, a mirror unit 20 and a display unit 10 are laminated.

Each of the mirror unit 20 and the display unit 10 is formed on one substrate. Accordingly, in the entire display device, a total of two substrates exist.

As illustrated in FIG. 1, each of the mirror unit 20 and the display unit 10 has a separated microcavity.

First, when briefly describing the mirror unit 20, the mirror unit includes a substrate 510, a first electrode 570 on the substrate 510, a second electrode 580 spaced apart from the first electrode 570 at a predetermined distance, a microcavity 560 formed between the first electrode 570 and the second electrode 580 and a capping layer 590 covering the entire upper portion of the second electrode 590. Although described below in detail, an electrolyte layer and an electrochromic layer are included in the microcavity, and a color of the electrochromic layer varies by supplying current to the first electrode and the second electrode and the electrochromic layer serve as a mirror. A detailed operational principle will be described below.

In the mirror unit 20 of the present inventive concept, the microcavity 560 is formed on a single substrate, and the first electrode 570 and the second electrode 590 are spaced apart from each other with the microcavity therebetween. That is, both the first electrode 570 and the second electrode 590 are formed on one substrate 510.

The display unit 10 is formed on the mirror unit 20. The display unit 10 includes a substrate 110, a microcavity 305 on the substrate 110, a liquid crystal layer 310 filled in the microcavity, and an overcoat 390, and although not illustrated in FIG. 1, a pixel electrode and a common electrode are formed in the microcavity to form an electric field in the liquid crystal layer.

As illustrated in FIG. 1, the display device according to the exemplary embodiment of the present inventive concept includes the mirror unit and the display unit. The mirror unit and the display unit are formed on one substrate, respectively, the microcavity is formed on one substrate, and an electrode for operating each of the mirror unit and the display unit is formed in the microcavity.

Accordingly, the display device according to the exemplary embodiment may serve as the display device or the mirror by applying power. Further, since each of the mirror unit and the display unit is formed on one substrate, entirely, two substrates exist to reduce a weight, a thickness, cost, and a processing time of the display device.

Hereinafter, structures of the display unit and the mirror unit will be described in detail. First, the display unit will be described.

Figure 2:
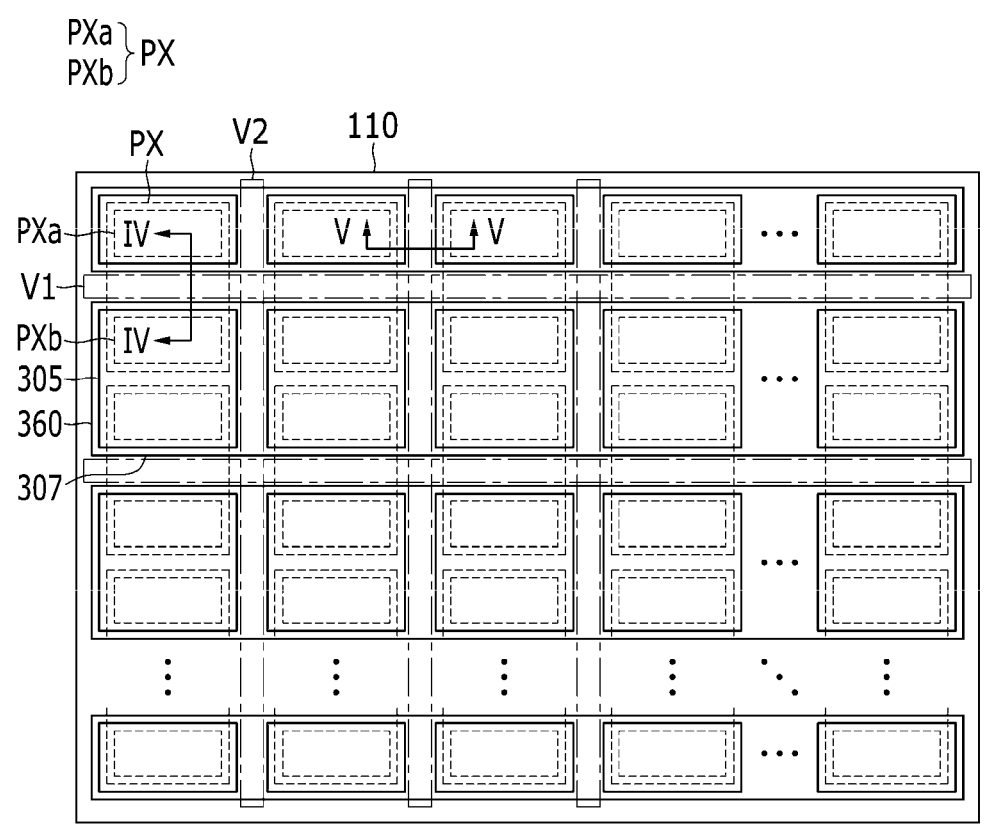
FIG. 2 is a plan view illustrating a display unit of the display device according to the exemplary embodiment of the present inventive concept.

FIG. 2 is a plan view illustrating a display unit of the display device according to the exemplary embodiment of the present inventive concept, and for convenience, in FIG. 2, only some constituent elements are illustrated.

The display device according to the exemplary embodiment of the present inventive concept schematically includes the substrate 110 made of a material such as glass or plastic, and a roof layer 360 formed on the substrate 110.

The substrate 110 includes a plurality of pixel areas PX. The plurality of pixel areas PX is disposed in a matrix form which includes a plurality of pixel rows and a plurality of pixel columns. Each pixel area PX may include a first subpixel area PXa and a second subpixel area PXb. The first subpixel area PXa and the second subpixel area PXb may be vertically disposed.

An injection hole formation region V1 is disposed between the first subpixel area PXa and the second subpixel area PXb in a pixel row direction, and a partition wall formation portion V2 is disposed between the plurality of pixel columns.

The roof layer 360 extends in a pixel row direction. In this case, in the injection hole formation region V1, the roof layer 360 is removed to form an inlet 307 so that a constituent element positioned below the roof layer 360 is exposed to the outside.

Each roof layer 360 is formed to be separated from the substrate 110 between the adjacent partition wall formation portions V2 to form the microcavity 305. Further, each roof layer 360 forms a partition wall in the partition wall formation portion V2 and covers both sides of the microcavity.

The structure of the display device according to the exemplary embodiment of the present inventive concept described above is just an example, and may be variously modified. For example, the layout form of the pixel area PX, the injection hole formation regions V1, and the partition wall formation portions V2 may be modified, and the plurality of roof layers 360 may be connected to each other in the injection hole formation regions V1, and a part of each roof layer 360 is separated from the substrate 110 in the partition wall formation portion V2 and thus the adjacent microcavities 305 may be connected to each other.

Next, one pixel of the display unit of the display device according to the exemplary embodiment of the present inventive concept will be described below with reference to FIGS. 2 to 5.

Figure 3:
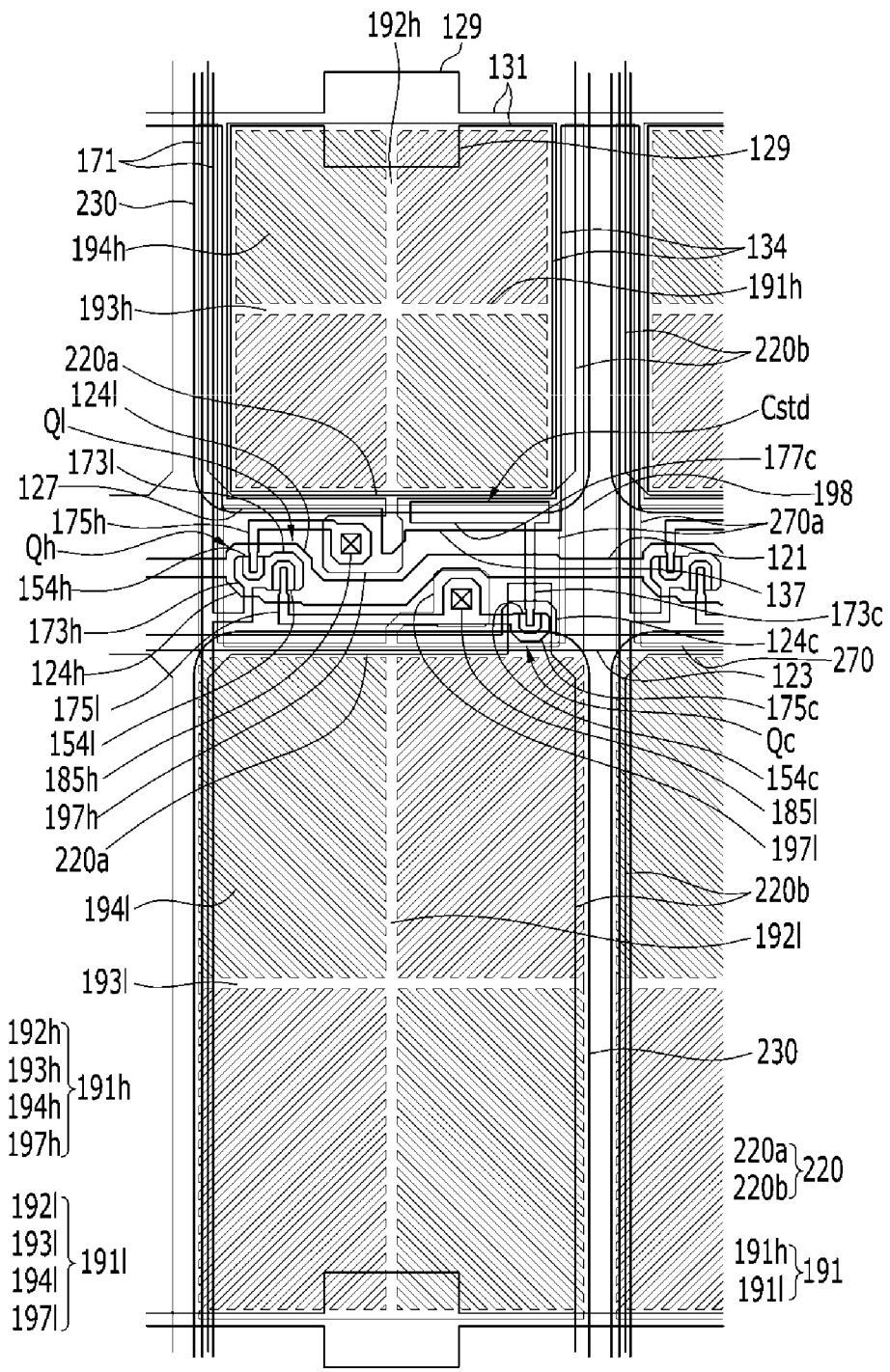
FIG. 3 is a plan view illustrating one pixel in the display device according to the exemplary embodiment of the present inventive concept.
Figure 4:
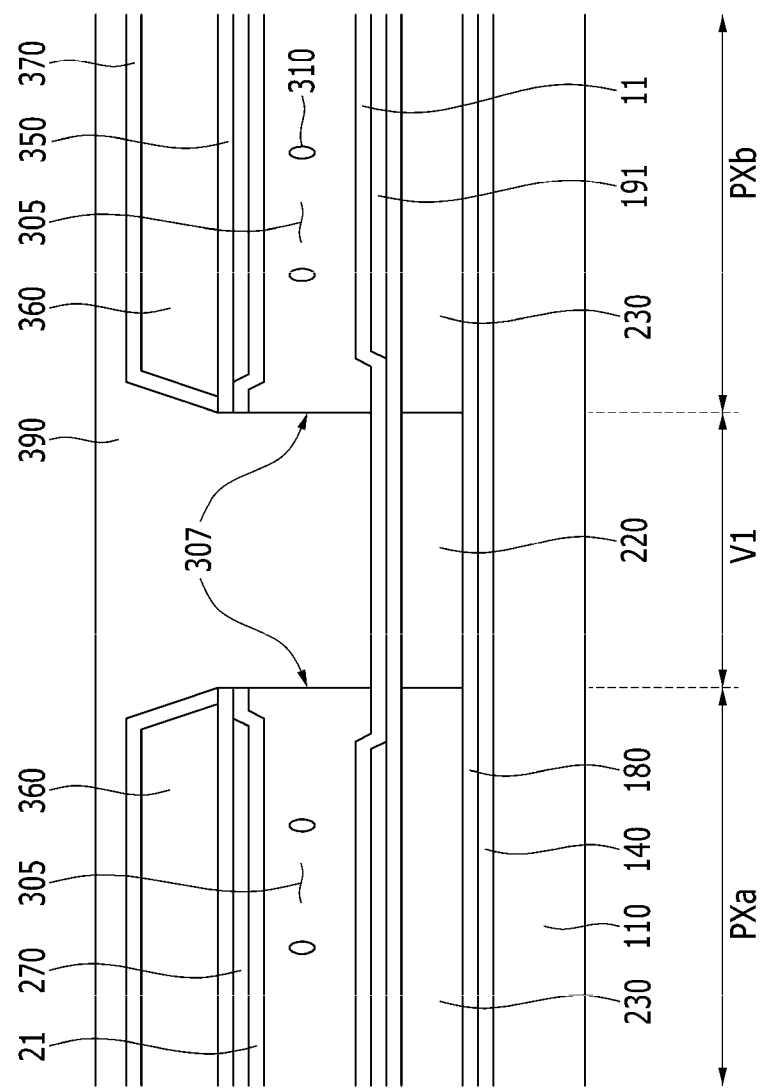
FIG. 4 is a cross-sectional view illustrating a part of the display device of FIG. 2 taken along line according to the exemplary embodiment of the present inventive concept.
Figure 5:
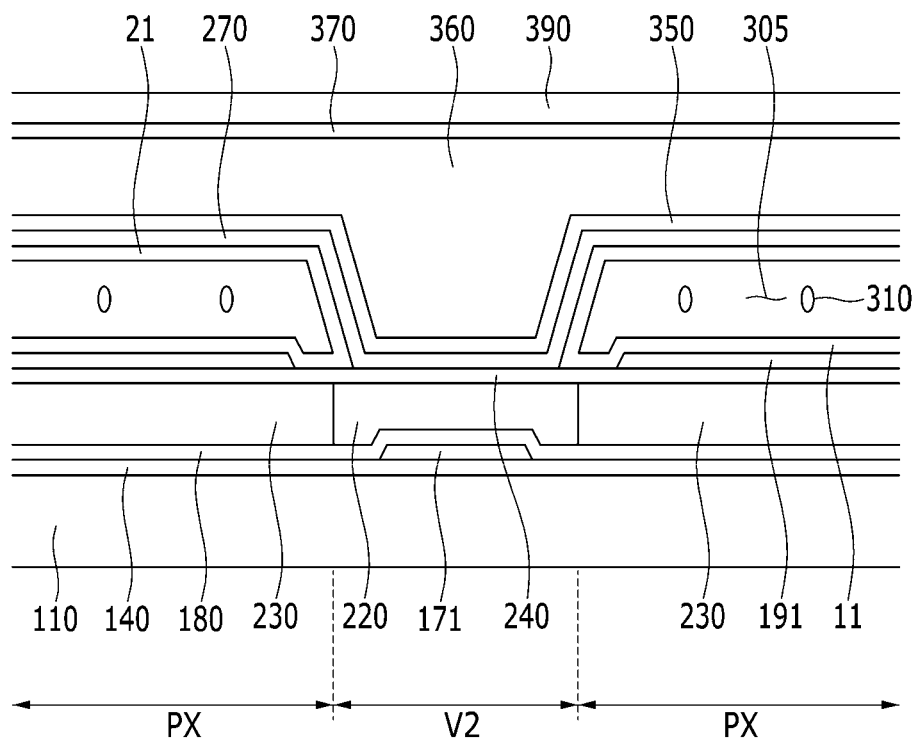
FIG. 5 is a cross-sectional view illustrating a part of the display device of FIG. 2 taken along line IV-IV according to the exemplary embodiment of the present inventive concept.

FIG. 3 is a plan view illustrating one pixel in the display device according to the exemplary embodiment of the present inventive concept, FIG. 4 is a cross-sectional view illustrating a part of the display device of FIG. 2 taken along line according to the exemplary embodiment of the present inventive concept, and FIG. 5 is a cross-sectional view illustrating a part of the display device of FIG. 2 taken along line IV-IV according to the exemplary embodiment of the present inventive concept.

Referring to FIGS. 2 to 5, a plurality of gate conductors including a plurality of gate lines 121, a plurality of step-down gate lines 123, and a plurality of storage electrode lines 131 are formed on the substrate 110.

The gate line 121 and the step-down gate line 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one projection. In this case, the projection form of the first, second, and third gate electrodes 124h, 124l, and 124c may be modified.

The storage electrode line 131 mainly extends in a horizontal direction and transfers a predetermined voltage such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134.

A gate insulating layer 140 is positioned on the gate conductor 121, 123, 124h, 124l, 124c, and 131. The gate insulating layer 140 may be made of an inorganic insulating material such as silicon nitride (SiNx) and silicon oxide (SiOx). Further, the gate insulating layer 140 may be formed as a single layer or a multilayer.

A first semiconductor layer 154h, a second semiconductor layer 154l, and a third semiconductor layer 154c are formed on the gate insulating layer 140. The first semiconductor layer 154h may be disposed on the first gate electrode 124h, the second semiconductor layer 154l may be disposed on the second gate electrode 124l, and the third semiconductor layer 154c may be disposed on the third gate electrode 124c. The first semiconductor 154h and the second semiconductor 154l may be connected to each other, and the second semiconductor 154l and the third semiconductor 154c may also be connected to each other. Further, the first semiconductor 154h may extend to the lower portion of the data line 171. The first to third semiconductors 154h, 154l, and 154c may be made of amorphous silicon, polycrystalline silicon, oxide semiconductor, and the like.

Ohmic contacts (not illustrated) may be further disposed on the first to third semiconductors 154h, 154l, and 154c, respectively. The ohmic contact may be made of silicide or a material such as n+ hydrogenated amorphous silicon in which an n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate lines 121 and the step-down gate lines 123. Each data line 171 includes a first source electrode 173h and a second source electrode 173l which extend toward the first gate electrode 124h and the second gate electrode 124l and are connected to each other.

Each of the first drain electrode 175h, the second drain electrode 175l, and the third drain electrode 175c includes one wide end portion and the other rod-shaped end portion. The rod-shaped end portions of the first drain electrode 175h and the second drain electrode 175l are partially surrounded by the first source electrode 173h and the second source electrode 173l. One wide end portion of the second drain electrode 175l again extends to form a third source electrode 173c which is bent in a 'U'-lettered shape. A wide end portion 177c of the third drain electrode 175c overlaps with the capacitive electrode 137 to form a step-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h, the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to form a stripe shape, and may have substantially the same planar shape as the data conductor 171, 173h, 173l, 173c, 175h, 175l, and 175c and the ohmic contacts therebelow, except for channel regions between the source electrodes 173h, 173l, and 173c and the drain electrodes 175h, 173l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed by a single layer or a multilayer.

A color filter 230 in each pixel PX is formed on the passivation layer 180. Each color filter 230 may display one of the primary colors such as three primary colors of red, green and blue. The color filter 230 is not limited to the three primary colors of red, green and blue, but may display one of cyan, magenta, yellow, and white-based colors. Unlike those illustrated above, the color filter 230 may be elongated in a column direction between the adjacent data lines 171.

A light blocking member 220 is disposed in a region between the adjacent color filters 230. The light blocking member 220 is formed on a boundary of the pixel PX and the thin film transistor to prevent light leakage. The color filter 230 is disposed in each of the first subpixel area PXa and the second subpixel area PXb, and the light blocking member 220 may be formed between the first subpixel area PXa and the second subpixel area PXb.

The light blocking member 220 includes a horizontal light blocking member 220a which extends upward and downward along the gate line 121 and the step-down gate line 123 and covers regions in which the first thin film transistor Qh, the second thin film transistor Ql, and the third thin film transistor Qc are disposed, and a vertical light blocking member 220b which extends along the data line 171. That is, the horizontal light blocking member 220a may be formed in the injection hole formation region V1, and the vertical light blocking member 220b may be formed in the partition wall formation portion V2. The color filter 230 and the light blocking member 220 may overlap with each other in a partial region.

The vertical light blocking member 220b may be omitted.

A first insulating layer 240 may be further formed on the color filter 230 and the light blocking member 220. The first insulating layer 240 may be made of an inorganic insulating material such as silicon nitride (SiNx), silicon oxide (SiOx), and silicon oxynitride (SiOxNy). The first insulating layer 240 serves to protect the color filter 230 made of the organic material and the light blocking member 220, and may be omitted if necessary.

A plurality of first contact holes 185h and a plurality of second contact holes 185l, which expose the wide end portion of the first drain electrode 175h and the wide end portion of the second drain electrode 175l, respectively, are formed through the first insulating layer 240, the light blocking member 220, and the passivation layer 180.

A pixel electrode 191 is formed on the first insulating layer 240. The pixel electrode 191 may be made of a transparent metal material such as indium tin oxide (ITO) and indium zinc oxide (IZO).

The pixel electrode 191 includes a first subpixel electrode 191h and a second subpixel electrode 191l which are separated from each other with the gate line 121 and the step-down gate line 123 therebetween and disposed above and below the pixel area PX based on the gate line 121 and the step-down gate line 123 to be adjacent to each other in a column direction. That is, the first subpixel electrode 191h and the second subpixel electrode 191l are separated from each other with the injection hole formation region V1 therebetween, the first subpixel electrode 191h is positioned in the first subpixel area PXa, and the second subpixel electrode 191l is positioned in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of each of the first subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and projections 197h and 197l protruding downward or upward from edge sides of the subpixel electrodes 191h and 191l, respectively.

The pixel electrode 191 is divided into four domains by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45° or 135° with the gate line 121 or the horizontal stems 193h and 193l. Further, extending directions of the minute branches 194h and 194l of the two adjacent domains may be orthogonal to each other.

In the exemplary embodiment, the first subpixel electrode 191h further includes an outer stem surrounding the outside, and the second subpixel electrode 191l further includes horizontal portions positioned at an upper end and a lower end, and left and right vertical portions 198 positioned at the left and the right of the first subpixel electrode 191*h*. The left and right vertical portions 198 may prevent capacitive coupling, that is, coupling between the data line 171 and the first subpixel electrode 191*h*.

The layout form of the pixel area, the structure of the thin film transistor, and the shape of the pixel electrode described above are just exemplified, and the present inventive concept is not limited thereto and may be variously modified.

The common electrode 270 is formed on the pixel electrode 191 so as to be spaced apart from the pixel electrode 191 at a predetermined distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified according to a size and a resolution of the display device.

The common electrode 270 may be made of a transparent conductive material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the first insulating layer 240 which is not covered by the pixel electrode 191.

A second alignment layer 21 is formed below the common electrode 270 so as to face the first alignment layer 11.

The first alignment layer 11 and the second alignment layer 21 may be formed by vertical alignment layers, and made of alignment materials such as polyamic acid, polysiloxane, and polyimide. The first and second alignment layers 11 and 21 may be connected to each other at the edge of the pixel area PX.

A liquid crystal layer configured by liquid crystal molecules 310 is formed in the microcavity 305 disposed between the pixel electrode 191 and the common electrode 270. The liquid crystal molecules 310 have negative dielectric anisotropy, and may align in a vertical direction to the substrate 110 while the electric field is not applied. That is, the liquid crystal molecules 310 may be vertically aligned.

The first subpixel electrode 191*h* and the second subpixel electrode 191*l* to which the data voltages are applied generate an electric field together with the common electrode 270 to determine directions of the liquid crystal molecules 310 disposed in the microcavity 305 between the two electrodes 191 and 270. Luminance of light passing through the liquid crystal layer varies according to the directions of the liquid crystal molecules 310 determined above.

A second insulating layer 350 may be further formed on the common electrode 270. The second insulating layer 350 may be made of an inorganic insulating material such as silicon nitride (SiNx), silicon oxide (SiOx), and silicon oxynitride (SiOxNy), and may be omitted if necessary.

The roof layer 360 is formed on the second insulating layer 350. The roof layer 360 may be made of an organic material. The microcavity 305 is formed below the roof layer 360, and the roof layer 360 is hardened by a curing process to maintain the shape of the microcavity 305. That is, the roof layer 360 is formed to be spaced apart from the pixel electrode 191 with the microcavity 305 therebetween.

The roof layers 360 are formed in each pixel area PX and the partition wall formation portion V2 along a pixel row, but are not formed in the injection hole formation region V1.

That is, the roof layer 360 is not formed between the first subpixel area PXa and the second subpixel area PXb. The microcavity 305 is formed below each roof layer 360 in each of the first subpixel area PXa and the second subpixel area PXb. The microcavity 305 is not formed below the roof layer 360 in the partition wall formation portion V2. Accordingly, a thickness of the roof layer 360 disposed in the partition wall formation portion V2 may be formed to be larger than that of the roof layer 360 disposed in the first subpixel area PXa and the second subpixel area PXb. An upper surface and both sides of the microcavity 305 are formed to be covered by the roof layer 360.

The inlet 307 exposing a part of the microcavity 305 is formed in the common electrode 270, the second insulating layer 350, and the roof layer 360. The inlets 307 may be formed to face each other at the edges of the first subpixel area PXa and the second subpixel area PXb. That is, the inlets 307 may be formed to correspond to the lower side of the first subpixel area PXa and the upper side of the second subpixel area PXb so as to expose the side of the microcavity 305. Since the microcavity 305 is exposed by the inlet 307, an aligning agent, a liquid crystal material, or the like may be injected into the microcavity 305 through the inlet 307.

A third insulating layer 370 may further formed on the roof layer 360. The third insulating layer 370 may be made of an inorganic insulating material such as silicon nitride (SiNx), silicon oxide (SiOx), and silicon oxynitride (SiOxNy). The third insulating layer 370 may be formed to cover an upper surface and a side of the roof layer 360. The third insulating layer 370 serves to protect the roof layer 360 made of an organic material.

Hereinabove, the structure in which the third insulating layer 370 is formed on the color filter 360 is described, but the present inventive concept is not limited thereto, and the third insulating layer 370 may be omitted.

The overcoat 390 may be formed on the third insulating layer 370. The overcoat 390 is formed to cover the inlet 307 exposing a part of the microcavity 305 to the outside. That is, the overcoat 390 may seal the microcavity 305 so as to prevent the liquid crystal molecules 310 formed in the microcavity 305 from being discharged to the outside. Since the overcoat 390 contacts the liquid crystal molecules 310, the overcoat 390 may be made of a material which does not react with liquid crystal molecules 310. For example, the overcoat 390 may be made of parylene and the like.

The overcoat 390 may be formed as a multilayer such as a double layer and a triple layer. The double layer is configured by two layers made of different materials. The triple layer is configured by three layers, and materials of adjacent layers are different from each other. For example, the overcoat 390 may include a layer made of an organic insulating material and a layer made of an inorganic insulating material.

Although not illustrated, polarizers may be further formed on upper and lower surfaces of the display device. The polarizers may be configured by a first polarizer and a second polarizer. The first polarizer may be attached onto the lower surface of the substrate 110, and the second polarizer may be attached onto the overcoat 390.

The display device according to the exemplary embodiment of the present inventive concept may be an ordinary LCD or OLED which has two substrates and a liquid crystal layer is disposed between the two substrates.

Next, the mirror unit of the display device according to the exemplary embodiment of the present inventive concept will be described with reference to FIGS. 6 and 7.

Figure 6:
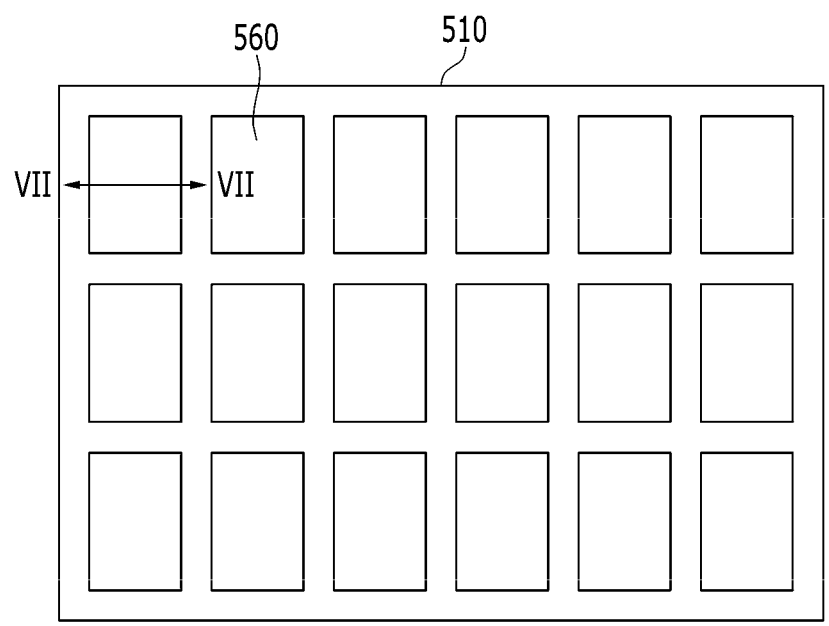
FIG. 6 is a plan view illustrating a mirror unit of the display device according to the exemplary embodiment of the present inventive concept.

FIG. 6 is a plan view illustrating the mirror unit of the display device according to the exemplary embodiment of the present inventive concept, and for convenience, FIG. 6 illustrates only some constituent elements. FIG. 7 is a cross-sectional view of the mirror unit of FIG. 6 taken along line VII-VII.

Referring to FIG. 6, in the mirror unit of the display device according to the exemplary embodiment of the present inventive concept, a plurality of microcavities 560 is formed on the substrate 510.

The microcavity 560 is separated from the adjacent microcavity, and the first electrode and the second electrode may be formed on a lower portion and an upper portion of the microcavity, respectively.

Referring to FIG. 1, a width M1 of the microcavity 560 of the mirror unit may be different from a width D1 of the microcavity of the display unit.

That is, the width M1 of the microcavity 560 of the mirror unit may be smaller than the width D1 of the microcavity of the display unit. The width M1 of the microcavity 560 of the mirror unit may be larger than the width D1 of the microcavity of the display unit. The width D1 of the microcavity of the display unit needs to be the same as the width of one pixel, but since the microcavity of the mirror unit does not configure one pixel unit, a size of the microcavity may be freely controlled in a range which may maintain the shape of the microcavity.

Figure 7:
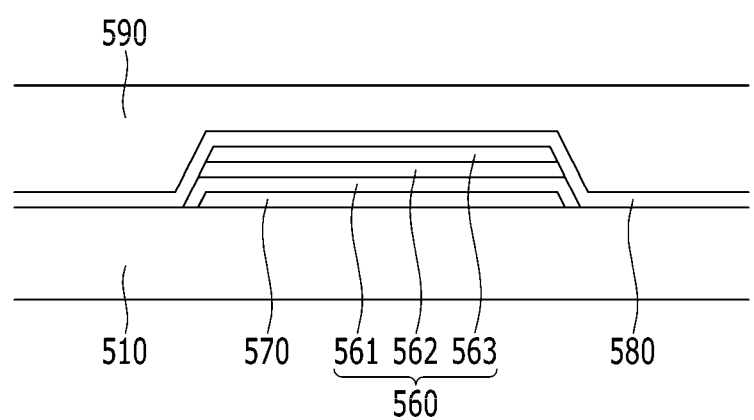
FIG. 7 is a cross-sectional view of the mirror unit of FIG. 6 taken along line VII-VII.

FIG. 7 is a cross-sectional view taken along a cross section of one microcavity of FIG. 6. One microcavity of the mirror unit of the present inventive concept will be described in detail with reference to FIG. 7.

First, the substrate 510 is provided. The substrate 510 may be a glass substrate, a plastic substrate, an indium tin oxide (ITO) substrate, or fluorine containing tin oxide (FTO) substrate on which fluorine is doped.

A first electrode 570 is disposed on the substrate 510. The first electrode 570 may be a metal electrode. The first electrode 570 may include at least one of aluminum (Al), silver (Ag), gold (Au), copper (Cu), and/or platinum (Pt). The first electrode 570 may provide a mirror function. The second electrode 580 is spaced apart from the first electrode with the microcavity therebetween. The second electrode may be a transparent electrode. That is, the second electrode may include transparent conductive oxide (TCO). For example, the second electrode 580 may be zinc oxide (ZnO), tin oxide (SnO$_2$), indium tin oxide (ITO), gallium-doped zinc oxide (ZnO:Al), boron-doped zinc oxide (ZnO:B), and/or aluminum-doped zinc oxide (AZO: Aluminum Zinc Oxide). The second electrode 580 may cover at least two opposing edges of the electrochromic layer 561, the electrolyte layer 562 and the ion storage layer 563. The second electrode 580 may cover three edges of the first electrode 570, the electrochromic layer 561, the electrolyte layer 562 and the ion storage layer 563.

In the microcavity 560, an electrochromic layer 561, an electrolyte layer 562, and an ion storage layer 563 are formed. The electrochromic layer 561 is disposed on the first electrode 570 to cover edges of the first electrode 570 to prevent short circuit between the first electrode 570 and a second electrode 580. The electrolyte layer 562 is disposed on the electrochromic layer 561. The ion storage layer 563 is disposed on the electrolyte layer 562. A color of the electrochromic layer 561 may be changed according to a flow of current due to power application. Accordingly, transmittance or reflectance of light may be controlled. According to the exemplary embodiment, the electrochromic layer 561 may include an inorganic colored material. In the inorganic colored material, cathodic coloration materials and anodic coloration materials are included. The cathodic coloration materials are colored when a reduction reaction occurs and decolored when an anodic reaction occurs. The cathodic coloration materials may be WO$_3$, TiO$_2$, MoO$_3$ and/or Nb$_2$O$_5$. The anodic coloration materials may be colored during oxidation reaction and decolored during reduction reaction. The anodic coloration materials may be Ni(OH)$_2$, Ir(OH)x, and/or CoO$_2$. According to another exemplary embodiment, the electrochromic layer 561 may include an organic colored material. The organic colored material may be polyaniline.

The electrolyte layer 562 may supply anodic/cathodic materials which react with an electrochromic layer 561. The electrolyte layer 562 may include solid, liquid and/or gel electrolyte layers. The electrolyte layer 562 may include a material having high ion conductivity and low electronic conductivity.

The electrolyte layer 562 may include at least one of inorganic oxides such as tantalum pentoxide (Ta$_2$O$_5$), antimonium oxide (Sb$_2$O$_5$), titanium oxide (TiO$_2$), zirconium oxide (ZrO$_2$) and/or aluminum oxide (Al$_2$O$_3$), include at least one of polymer materials such as poly(acrylic acid), poly(methyl methacrylate), poly(ethylene oxide), and poly (vinyl chloride), and also include at least one of propylene-based materials and/or carbonate-based materials. A thickness of the electrolyte layer 562 may be controlled. Accordingly, when a display mode operates, light which is not absorbed in an electrochromic unit 300 may be minimized.

The ion storage layer 563 may include CeO$_2$ and/or TiO$_2$. The ion storage layer 563 may serve to store ions (for example, hydrogen ions or lithium ions) during coloration and decoloration of the electrochromic unit. Materials used in the ion storage layer do not have an absorption wavelength in a visible light area in an anodic state or a cathodic state to always have a transparent property.

A capping layer 590 is formed on the second electrode 580. The capping layer 390 may seal the microcavity 560 so as to prevent the electrolyte layer 562 formed in the microcavity 560 from being discharged to the outside and planarize the surface of the mirror unit 20.

The display device of the present inventive concept is configured by the laminated structure of the display unit and the mirror unit to be shifted to a display mode and a mirror mode.

The display mode may operate by applying (−) voltage to the second electrode 580 and (+) voltage to the first electrode 570. The electrochromic layer 561 may include cathodic coloration materials such as tungsten oxide WO$_3$. When the voltage is applied, the electrochromic layer 561 displays a color through a process of the following Chemical Formula.

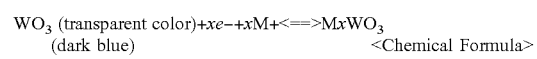

$$\text{WO}_3 \text{ (transparent color)} + xe^- + x\text{M}^+ \Longleftrightarrow \text{M}_x\text{WO}_3$$
$$\text{(dark blue)} \qquad \text{<Chemical Formula>}$$

In the Chemical Formula, M may be hydrogen (H) or lithium (Li).

WO$_3$ may be in a transparent state, and M$_x$WO$_3$ may be in a colored state.

When the voltage is applied, ions M in the ion storage layer 563 may move to the electrochromic layer 561 through the electrolyte layer 562. The moved ions may generate H$_x$WO$_3$ by reacting with WO$_3$ which is the cathodic coloration materials of the electrochromic layer 561. The electrochromic layer 561 may be changed to the colored state of dark blue. Accordingly, the mirror unit 20 of the display device may serve as a black backplane required for the operation of the display unit 10.

The mirror mode may operate by applying (+) voltage to the second electrode 580 and (−) voltage to the first electrode 570. When voltage in an opposite direction to the display mode is applied, ion (M+)s are discharged from the electrochromic layer 561 to move to the ion storage layer 563 through the electrolyte layer 562. The electrochromic layer 561 in the $MxWO_3$ state may be transformed to $WO_3$ and M+. The electrochromic layer 561 may be changed to the transparent state. Accordingly, the mirror unit 20 may represent a characteristic of the mirror by the first electrode 570 including a metal material.

The display device including the anodic coloration materials may drive the display mode and the mirror mode by applying the voltage in the opposite direction to the display device including the cathodic coloration materials.

Figure 8:
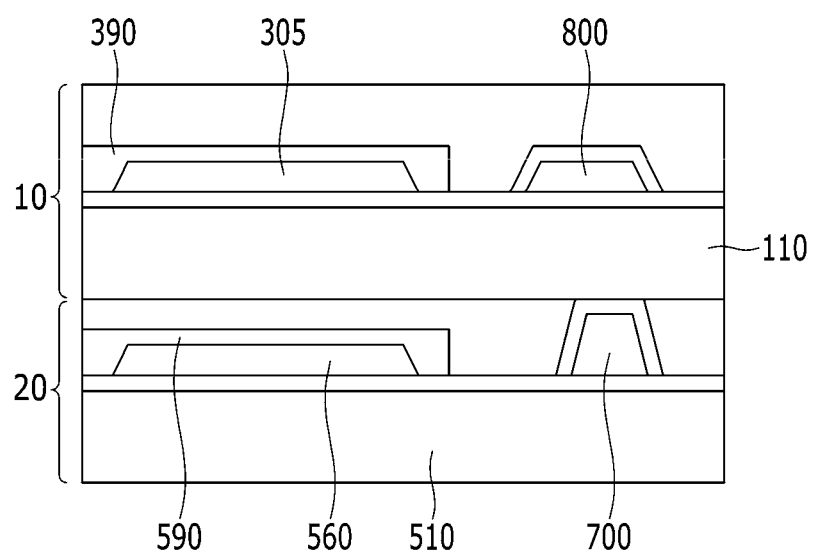
FIG. 8 is a diagram illustrating outer sides of the display unit and the mirror unit of the display device according to the exemplary embodiment of the present inventive concept.

FIG. 8 is a diagram illustrating outer sides of the display unit and the mirror unit of the display device according to the exemplary embodiment of the present inventive concept. Referring to FIG. 8, contact electrodes are formed outside the lower display unit and outside the mirror unit. Although not illustrated, a display unit contact electrode 800 outside the display unit and a contact electrode 700 outside the mirror unit may be connected to the same driver to be driven. That is, each driver may be connected to the driver which applies a proper voltage signal to the display unit and the mirror unit in the case of the mirror mode and the display mode.

FIGS. 9 to 12 illustrate display devices according to various exemplary embodiments of the present inventive concept.

Figure 9:
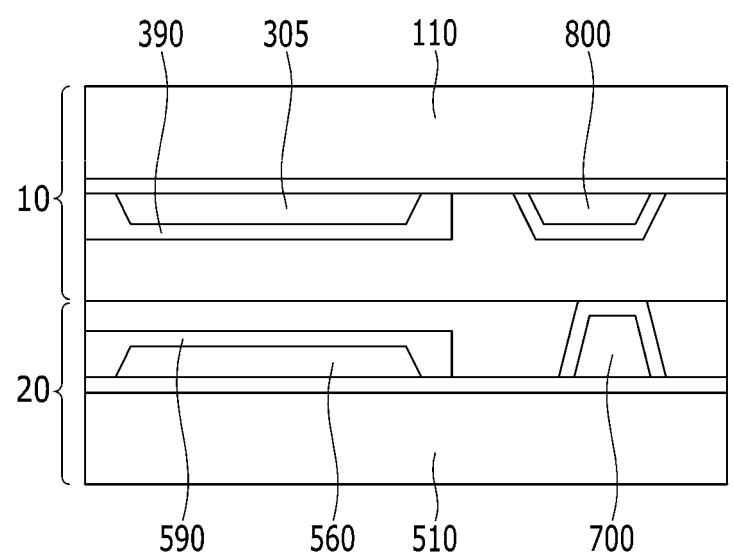
FIG. 9 illustrates a display device according to another exemplary embodiment of the present inventive concept.

Referring to FIG. 9, in the display device according to the exemplary embodiment, the substrate 110 of the display unit and the substrate 510 of the mirror unit may be formed in opposite directions to each other. That is, as illustrated in FIG. 9, the microcavity 560 of the mirror unit and the microcavity 305 of the display unit may be formed to face each other.

In the display device having the structure, the substrates 110 and 510 are positioned at both outer sides of the display device, thereby ensuring structural stability.

Figure 10:
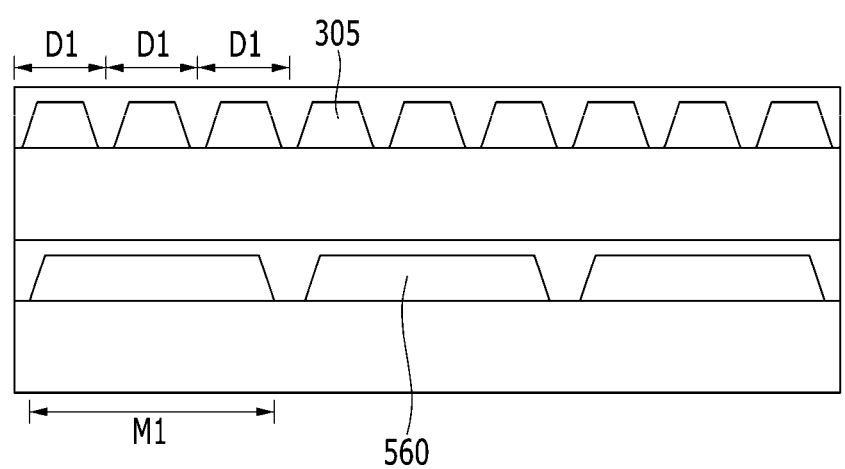
FIG. 10 illustrates a cross section of the display device according to another exemplary embodiment of the present inventive concept.

FIG. 10 illustrates a cross section of the display device according to another exemplary embodiment of the present inventive concept. Referring to FIG. 10, widths of the microcavities of the display unit and the mirror unit may not be the same as each other. As illustrated in FIG. 10, a width M1 of one microcavity of the mirror unit 20 may be larger than a width D1 of one microcavity of the display unit 10.

The reason is that since the width D1 of the microcavity of the display unit is the same as the width of one pixel, the width needs to be decreased for a high resolution, but since the microcavity of the mirror unit does not configure one pixel unit, a size of the microcavity may be freely controlled in a range which may maintain the shape of the microcavity.

Accordingly, a width M1 of the microcavity 560 may be freely increased in a range which may maintain a shape of the microcavity M1 without sagging. That is, the width D1 of the microcavity of the display unit and the width M1 of the microcavity of the mirror unit may not be the same as each other.

Figure 11:
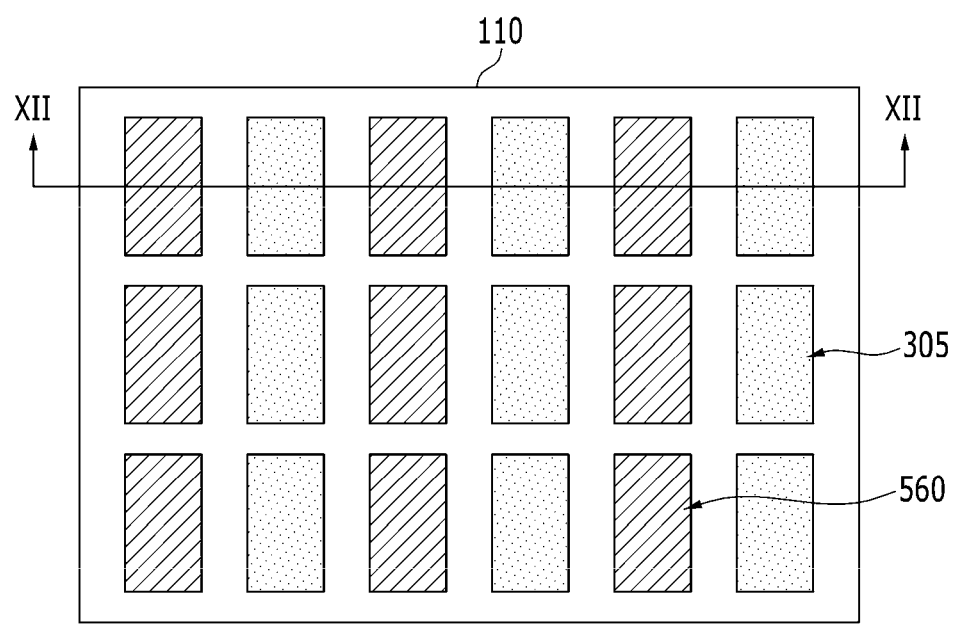
FIG. 11 is a plan view schematically illustrating the display device according to another exemplary embodiment of the present inventive concept.
Figure 12:
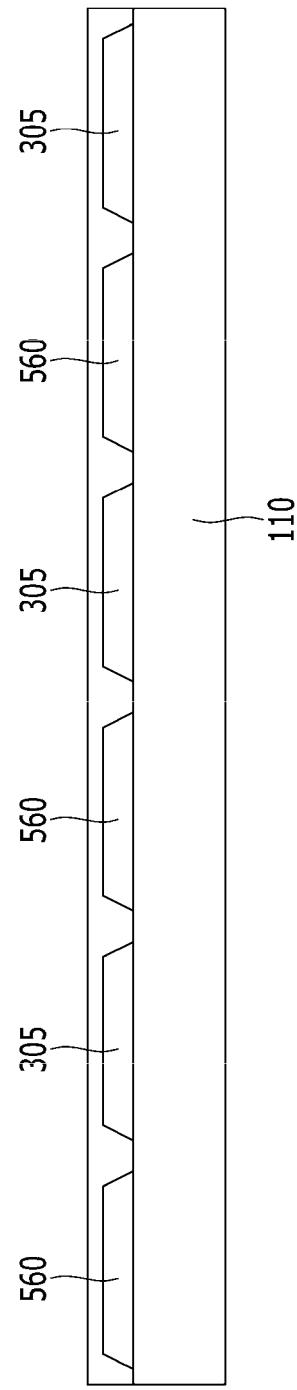
FIG. 12 is a cross-sectional view of the display device of FIG. 11 taken along line XII-XII.

FIG. 11 is a plan view schematically illustrating the display device according to another exemplary embodiment of the present inventive concept. FIG. 12 is a cross-sectional view of the display device of FIG. 11 taken along line XII-XII.

Referring to FIGS. 11 and 12, in the display device according to the exemplary embodiment, both the microcavity 560 of the mirror unit and the microcavity 305 of the display unit are formed on one substrate.

That is, a plurality of microcavities is formed on one substrate, and in some microcavities, the liquid crystal is injected and the pixel electrode and the common electrode are formed to serve as the display unit, and in some microcavities, the electrochromic layer, the electrolyte layer, and the like are formed and the first electrode and the second electrode are formed to serve as the mirror unit.

In this case, the common electrode of the microcavity of the display unit and the second electrode of the microcavity of the mirror unit may be made of the same material and formed by a single process.

Referring to FIG. 12, the microcavity 560 of the mirror unit and the microcavity 305 of the display unit are alternately arranged. Widths of the microcavities may be the same as each other, and in order to improve display quality, the width of the microcavity of the mirror unit may be smaller than the width of the microcavity of the display unit.

In this case, detailed laminated structure and description for each microcavity are the same as those described in the above exemplary embodiment.

In the case of the display device according to the exemplary embodiment, both the mirror mode and the display mode may be implemented by one substrate, thereby minimizing a thickness of the display device.

As described above, in the case of the display device according to the exemplary embodiment of the present inventive concept, the display unit and the mirror unit are laminated to operate in the display mode and the mirror mode, and only one substrate is used in each of the display unit and the mirror unit to minimize the thickness of the entire display device. That is, the number of substrates may be reduced from a total of four of two display units and two mirror units to two by forming the display unit and the mirror unit with the structure having the microcavities.

Figure 13:
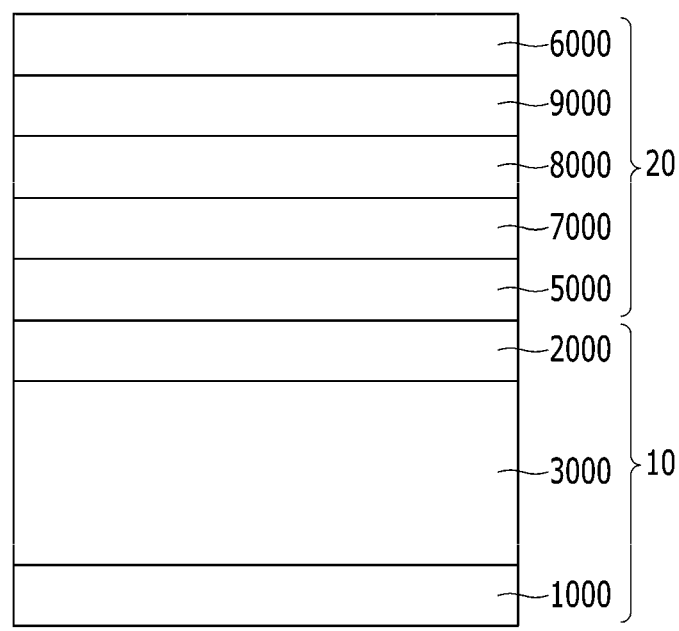
FIG. 13 schematically illustrates a display device according to a Comparative Example of the present inventive concept.

FIG. 13 schematically illustrates a display device according to a Comparative Example of the present inventive concept.

Referring to FIG. 13, in the display device according to the Comparative Example of the present inventive concept, a display unit 10 includes a first substrate 1000, a second substrate 2000, and a liquid crystal layer 3000 interposed therebetween. In this case, a pixel electrode is formed in the first substrate 1000 and the common electrode is formed in the second substrate, and may be vice versa. Alternatively, the pixel electrode and the common electrode may exist on one substrate to be insulated from each other, and in this case, a light blocking member or a color filter may be formed on a substrate without the electrode.

Next, the mirror unit 20 includes a mirror unit first substrate 5000, a mirror unit second substrate 6000, an electrochromic layer 7000 therebetween, an electrolyte layer 8000, and an ion storage layer 9000.

On the mirror unit first substrate 5000, a first electrode (not illustrated) which is a transparent electrode is formed, and on the mirror unit second substrate 6000, a second electrode (not illustrated) which is a metal electrode is formed.

That is, in the case of the display device according to the Comparative Example of the present inventive concept, two substrates are formed in the display unit and two substrates are formed in the mirror unit, and a total of four substrates are required in the entire display device.

However, in the display device according to the exemplary embodiment of the present inventive concept, the number of substrates may be reduced from four to two by forming the display unit and the mirror unit with the structure having the microcavities. Further, when the display unit microcavity and the mirror unit microcavity are alternately formed on a single substrate, the number of substrates may be reduced to one. As such, the display device according to the exemplary embodiment of the present inventive concept may reduce a weight, a thickness, cost, and a processing time.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device, comprising:
a display unit and a mirror unit adjacent to each other,
wherein the display unit includes:
a first substrate;
a thin film transistor formed on the substrate,
a pixel electrode connected to the thin film transistor,
a roof layer formed on the pixel electrode to be spaced apart from the pixel electrode with a microcavity therebetween, and
a liquid crystal layer filling the microcavity, and
wherein the mirror unit includes:
a second substrate,
a first electrode formed on the second substrate,
a second electrode formed on the first electrode to be spaced apart from the first electrode with a microcavity therebetween, and
an electrochromic layer formed in the microcavity.

2. The display device of claim 1, wherein:
the first substrate of the display unit is laminated on the second electrode of the mirror unit.

3. The display device of claim 1, wherein:
the roof layer of the display unit is positioned on the second electrode of the mirror unit to face each other, and
the second substrate of the mirror unit and the first substrate of the display unit are formed at both outer sides of the display device.

4. The display device of claim 1, wherein:
the display unit
further includes an overcoat formed on the roof layer to seal the microcavity.

5. The display device of claim 1, further comprising:
an electrolyte layer and an ion injection layer sequentially laminated on the electrochromic layer in the microcavity of the mirror unit, and
an overcoat sealing the microcavity.

6. The display device of claim 1, wherein:
the first electrode of the mirror unit is a metal electrode.

7. The display device of claim 6, wherein:
the second electrode of the mirror unit is a transparent electrode.

8. The display device of claim 1, wherein:
a width of the microcavity of the display unit and a width of the microcavity of the mirror unit are not the same as each other.

9. The display device of claim 8, wherein:
the width of the microcavity of the mirror unit is larger than the width of the microcavity of the display unit.

10. The display device of claim 1, wherein:
when the display device operates in a display mode,
the electrochromic layer of the mirror unit displays a color.

11. The display device of claim 1, wherein:
when the display device operates in a mirror mode,
the electrochromic layer of the mirror unit is transparent.

12. The display device of claim 1, wherein:
driving of the display unit and driving of the mirror unit are performed in one driver.

13. A display device, comprising:
a substrate; and
a plurality of microcavities formed on the substrate,
wherein the plurality of microcavities is divided into a microcavity of a mirror unit and a microcavity of the display unit,
wherein the microcavity of a display unit includes:
a pixel electrode,
a roof layer formed on the pixel electrode the roof layer and the pixel electrode forming the microcavity of the display unit disposed therebetween, and
a liquid crystal layer filling the microcavity, and
wherein the microcavity of the mirror unit includes:
a first electrode,
a second electrode formed on the substrate, the first electrode and the second electrode forming the microcavity of the mirror unit disposed therebetween, and
an electrochromic layer formed in the microcavity.

14. The display device of claim 13, wherein:
the microcavities of the mirror unit and the microcavities of the display unit are alternately disposed for every line in a row or column direction.

15. The display device of claim 13, wherein:
the width of the microcavity of the mirror unit is smaller than the width of the microcavity of the display unit.

16. The display device of claim 13, further comprising:
an overcoat sealing the microcavity.

17. The display device of claim 13, further comprising
an electrolyte layer and an ion injection layer sequentially laminated on the electrochromic layer in the micro cavity of the mirror unit.

18. The display device of claim 13, wherein:
the first electrode of the mirror unit is a metal electrode, and the second electrode of the mirror unit is a transparent electrode.

19. The display device of claim 13, wherein:
the pixel electrode and the common electrode of the display unit are transparent electrodes.

20. The display device of claim 13, wherein:
the second electrode of the mirror unit and the common electrode of the display unit are formed by a single process.

* * * * *